US012741406B2

(12) United States Patent
Miyatake

(10) Patent No.: US 12,741,406 B2
(45) Date of Patent: Sep. 22, 2026

(54) COUPLING DEVICE AND MOLTEN RESIN SUPPLY SYSTEM

(71) Applicant: SUMITOMO HEAVY INDUSTRIES, LTD., Tokyo (JP)

(72) Inventor: Tsutomu Miyatake, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 96 days.

(21) Appl. No.: 18/911,359

(22) Filed: Oct. 10, 2024

(65) Prior Publication Data

US 2025/0121541 A1 Apr. 17, 2025

(30) Foreign Application Priority Data

Oct. 12, 2023 (JP) ................................ 2023-176626

(51) Int. Cl.
*B29C 45/17* (2006.01)
*B29C 45/18* (2006.01)
*B29C 37/00* (2006.01)

(52) U.S. Cl.
CPC .......... *B29C 45/1775* (2013.01); *B29C 45/18* (2013.01); *B29C 2037/96* (2013.01)

(58) Field of Classification Search
CPC .................................................. B29C 2037/96
See application file for complete search history.

(56) References Cited

U.S. PATENT DOCUMENTS

2022/0055272 A1 2/2022 Siao
2022/0314507 A1* 10/2022 Zipse .................. B29C 45/1645
2022/0324143 A1 10/2022 Klammer et al.
2023/0286196 A1 9/2023 Rostamimouri et al.

FOREIGN PATENT DOCUMENTS

CN 115416222 A * 12/2022 ............ B29C 45/18
DE 19505984 A1 8/1996
DE 102012105090 B4 9/2014
DE 102022108238 A1 10/2022
JP WO2021145139 A1 * 7/2021 ............ B01D 53/26
KR 20090095053 A * 9/2009 ............ B29C 45/06
WO WO 2010/148478 A1 12/2010
WO WO2022/056618 A 3/2022

OTHER PUBLICATIONS

Kim KR20090095053A English Translation 2009 (Year: 2009).*
Tajima WO2021145139A1 English Translation 2021 (Year: 2021).*
Guo CN115416222A English Translation 2022 (Year: 2022).*
Office Action of the corresponding DE 102024128919.8 mailed on Feb. 12, 2026.

* cited by examiner

*Primary Examiner* — Jacob T Minskey
*Assistant Examiner* — Adrien J Bernard
(74) *Attorney, Agent, or Firm* — WTA IP Law P.C.

(57) ABSTRACT

A coupling device includes a pipe including at least pipes through which a molten resin passes, in which the coupling device couples an output device that outputs the molten resin to be recycled and an injection molding machine that performs injection molding of the molten resin with each other by connecting an upstream end part of the pipe to the output device and connecting a downstream end part of the pipe to the injection molding machine, and the coupling device includes, on a downstream side of the pipe, a removal dissolution unit that removes or dissolves a solid foreign matter mixed in the molten resin.

11 Claims, 6 Drawing Sheets

COUPLING DEVICE AND MOLTEN RESIN SUPPLY SYSTEM

CROSS-REFERENCE TO RELATED APPLICATIONS

This application claims priority to Japanese Patent Application No. 2023-176626, filed on Oct. 12, 2023, which is incorporated by reference herein in its entirety.

BACKGROUND

Technical Field

The present invention relates to a coupling device and a molten resin supply system.

Description of Related Art

In order to directly input a molten resin output from a decontamination machine, which performs decontamination of a contaminant contained in a resin to be recycled using a mechanical recycling method, into an injection molding machine, the decontamination machine and the injection molding machine may be coupled with each other by a pipe. In this case, a sleeve (sliding telescopic pipe coupling) may be provided in a coupling of the pipe in order to absorb the movement of a position of a plasticizing cylinder of the injection molding machine due to the discharge (purge) of the molten resin in the plasticizing cylinder (for example, the related art).

SUMMARY

According to an embodiment of the present invention, there is provided a coupling device including: a pipe including at least pipes through which a molten resin passes, in which the coupling device couples an output device that outputs the molten resin to be recycled and an injection molding machine that performs injection molding of the molten resin with each other by connecting an upstream end part of the pipe to the output device and connecting a downstream end part of the pipe to the injection molding machine, and the coupling device includes, on a downstream side of the pipe, a removal dissolution unit that removes or dissolves a solid foreign matter mixed in the molten resin.

Here, the coupling device may further include a coupling that displaces, when at least a part of the injection molding machine moves relative to the output device, a part of the pipe to absorb the movement.

In addition, the removal dissolution unit may be disposed on a downstream side of the coupling in the pipe and on an upstream side of the injection molding machine.

In addition, the removal dissolution unit may be a filtration device that removes the solid foreign matter by filtering and separating the solid foreign matter.

In addition, the filtration device may be a screen changer that enables detachment and replacement of a filter for filtering and separating the solid foreign matter.

In addition, the coupling may be a sleeve-type telescopic pipe coupling.

In addition, the coupling may be a flexible metal hose.

In addition, the coupling may be a swivel joint.

In addition, according to an embodiment of the present invention, there is provided a molten resin supply system including: an output device that includes an output port of which a position is fixed and that outputs a molten resin to be recycled from the output port; an injection molding machine that includes an input port of which a position is movable and that molds a molding product using the molten resin input through the input port; and a coupling device that includes a pipe through which the molten resin passes, that couples the output device and the injection molding machine with each other by connecting an upstream end part of the pipe to the output port and connecting a downstream end part of the pipe to the input port, and that includes, on a downstream side of the pipe, a removal dissolution unit that removes or dissolves a solid foreign matter mixed in the molten resin.

BRIEF DESCRIPTION OF THE DRAWINGS

FIG. 3A is a view showing an example of an external configuration of the coupling device. FIG. 3B is an enlarged view of a part of the sleeve-type telescopic pipe coupling of the coupling device.

FIG. 4A is a view showing an example of an external configuration of the coupling device. FIG. 4B is an enlarged view of a part of the flexible metal hose of the coupling device.

DETAILED DESCRIPTION

In a case where the sleeve is provided as the coupling of the pipe, the sleeve slides with the movement of the position of the plasticizing cylinder, and moves between an inside and an outside of the pipe. In this case, the molten resin passing through the inside of the pipe may be exposed to the outside of the pipe while adhering to the surface of the sleeve. Therefore, when the sleeve slides, the exposed molten resin may be abraded and carbonized, and mixed as a solid foreign matter in the molten resin passing through the pipe. In cases where the solid foreign matter is mixed in the molten resin passing through the pipe due to some reason, including a case where the sleeve is provided as the coupling of the pipe, this solid foreign matter can cause molding quality defects and the like in the injection molding machine that performs the molding using the molten resin as a material.

It is desirable to prevent a solid foreign matter mixed in a molten resin passing through a pipe or generated in the pipe from being input into an injection molding machine together with the molten resin.

Hereinafter, embodiments of the present invention will be described in detail with reference to the accompanying drawings.

One Embodiment

Configuration of Molten Rein Supply System 1

Figure 1:
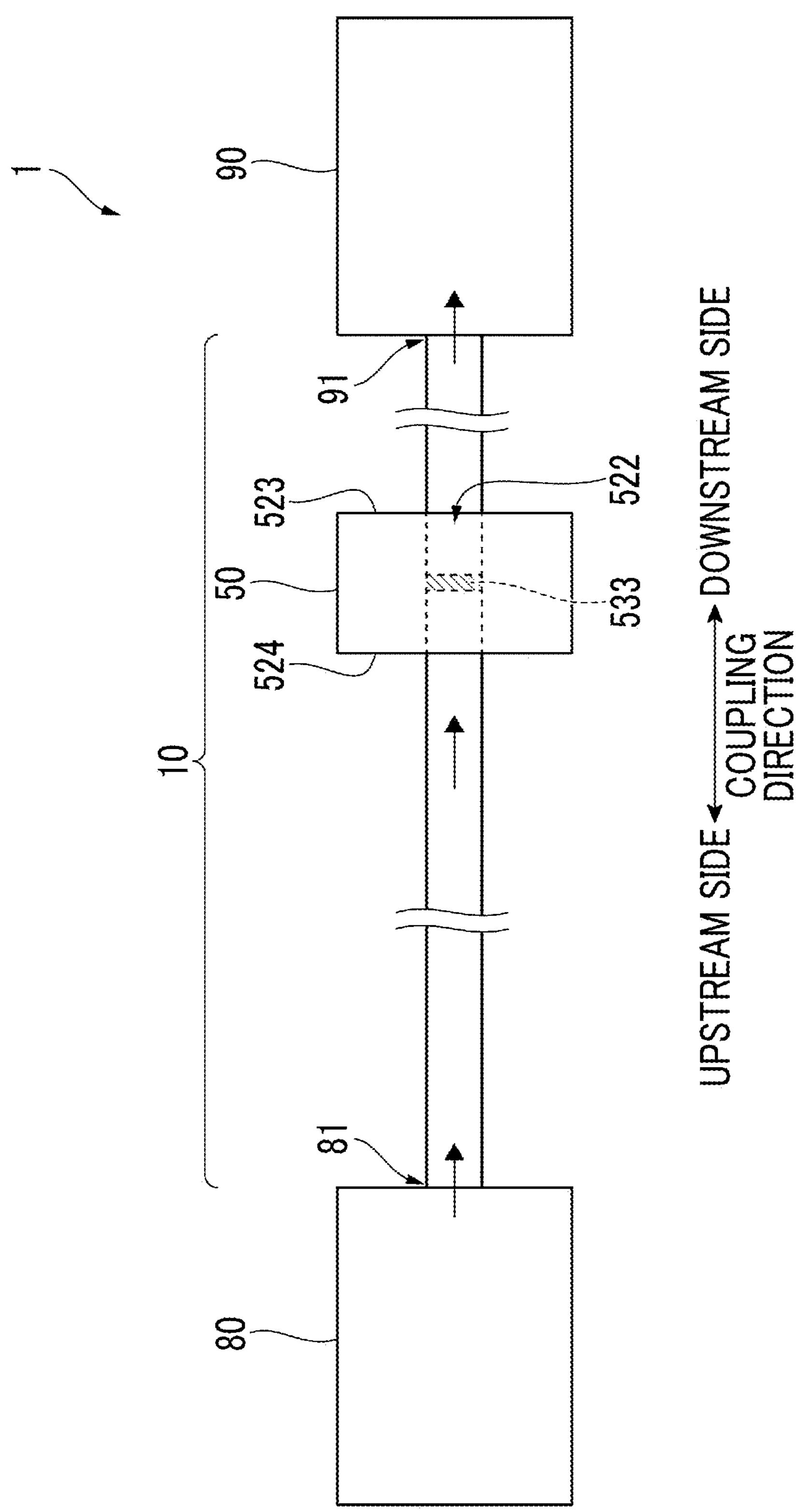
FIG. 1 is a conceptual view showing an overall configuration of a molten resin supply system including a coupling device according to one embodiment.

FIG. 1 is a conceptual view showing an overall configuration of a molten resin supply system 1 including a coupling device 10 according to one embodiment.

Figure 2:
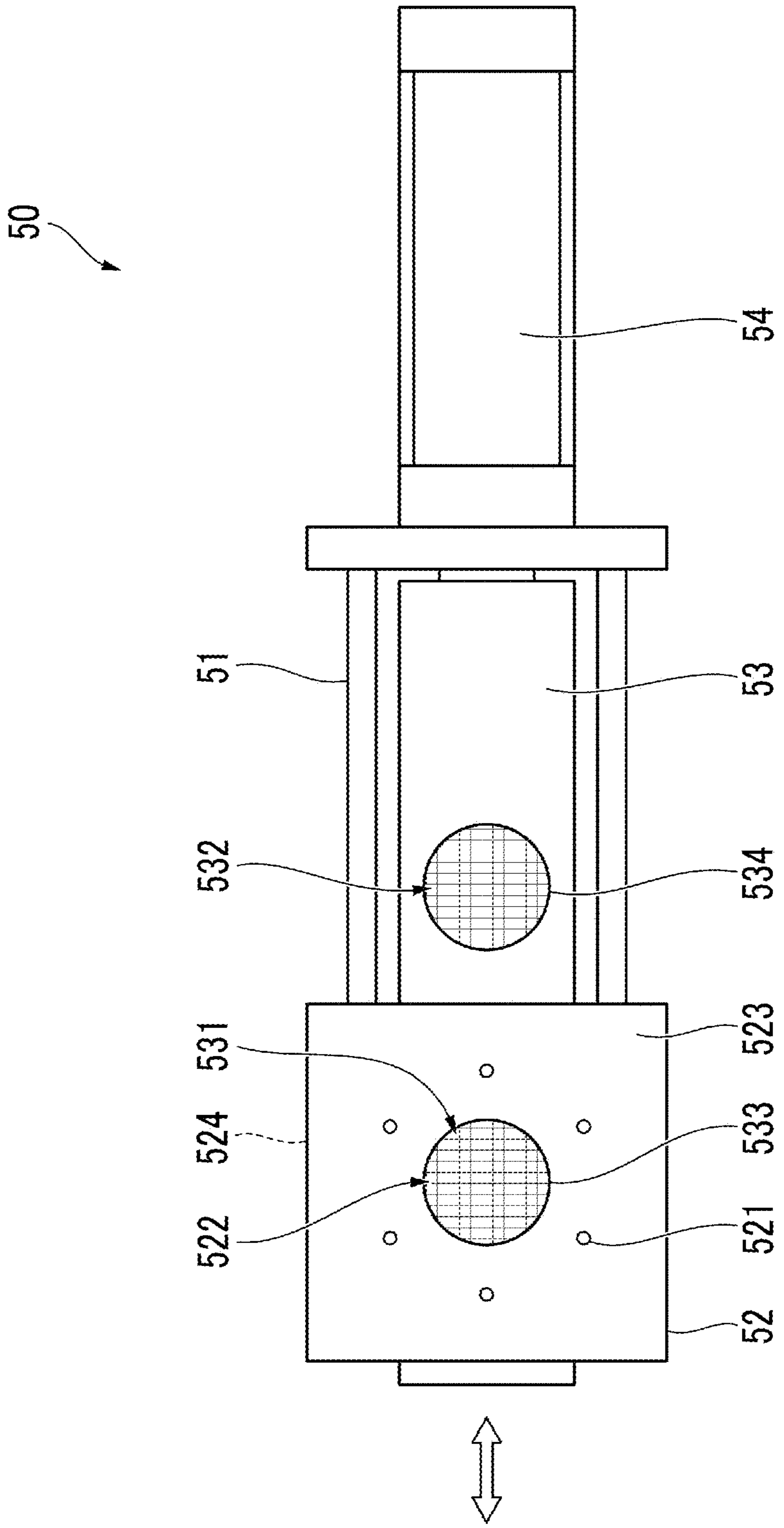
FIG. 2 is a view showing an example of an external configuration of a screen changer as a removal dissolution unit constituting the coupling device.

FIG. 2 is a view showing an example of an external configuration of a screen changer as a removal dissolution unit 50 constituting the coupling device 10.

The molten resin supply system 1 shown in FIG. 1 is a system including a coupling device 10, an output device 80 that outputs a molten resin to be recycled, and an injection molding machine 90 that performs injection molding using the molten resin.

Coupling Device 10

The coupling device 10 is a device that includes a pipe that includes pipes through which the molten resin passes and that couples the output device 80 disposed on an upstream side in a direction (hereinafter, referred to as a "coupling direction") in which the output device 80 and the injection molding machine 90 are coupled with each other, and the injection molding machine 90 disposed on a downstream side with each other via the pipe.

The coupling device 10 includes a removal dissolution unit 50 that removes or dissolves a solid foreign matter mixed in the molten resin on the downstream side in the pipe. The removal dissolution unit 50 is disposed on a downstream side of a coupling in the pipe and on an upstream side of the injection molding machine 90 at a position at which a flow direction of the molten resin is not changed. A configuration of the coupling of the pipe will be described later. A method of removing or dissolving the solid foreign matter in the removal dissolution unit 50 is not particularly limited. For example, the removal dissolution unit 50 may be a filtration device that removes the solid foreign matter by filtering and separating the solid foreign matter. In addition, for example, the removal dissolution unit 50 may be a device that dissolves the solid foreign matter using chemicals, or may be a device that mechanically crushes and dissolves the solid foreign matter. In the present embodiment, a screen changer as the filtration device that removes the solid foreign matter by filtering and separating the solid foreign matter is used.

The screen changer is a filtration device having a mechanism for cleaning or replacing a filtration and separation part (hereinafter, referred to as a "filter"). For example, the screen changer includes a plurality of filters. The screen changer moves the plurality of filters, thereby disposing some of the filters at a position the solid foreign matter can be filtered and separated and disposing the remaining filters at a position at which the filters can be cleaned or replaced. In addition, the screen changer has a plurality of paths on which the filters are disposed, causes, on some of the paths, the molten resin to flow through the paths to filter and separate the solid foreign matter, and cleans or replaces the filters on the remaining paths without causing the molten resin to flow through the paths.

As shown in FIG. 2, the screen changer as the removal dissolution unit 50 includes a main body 51, a connecting part 52, a sliding part 53, and a cylinder part 54.

The main body 51 is a member that positions the connecting part 52, the sliding part 53, and the cylinder part 54. The connecting part 52 is a quadrangular columnar member, and is provided with a through-hole 522 penetrating a surface 523 on a front side in FIG. 2 (downstream side in FIG. 1) and a surface 524 on a rear side in FIG. 2 (upstream side in FIG. 1). Each of the surfaces 523 and 524 of the connecting part 52 is provided with a plurality of screw holes 521, and is connected to an end part of the pipe by a bolt (not shown) or the like in a detachable and replaceable manner.

The sliding part 53 is a member that slides in a direction perpendicular to the coupling direction. The sliding part 53 is provided with two through-holes 531 and 532 penetrating the sliding part 53 from the front side toward the rear side in FIG. 2 (from the upstream side to the downstream side in the coupling direction). The through-holes 531 and 532 change positions thereof in the direction perpendicular to the coupling direction as the sliding part 53 slides. Any one of the through-holes 531 and 532 slides and overlaps with the through-hole 522 of the connecting part 52 to form one through-hole.

Filters 533 and 534 having a filtration function of filtering and separating the solid foreign matter mixed in the molten resin are respectively disposed in the through-holes 531 and 532. In this manner, as shown in FIG. 1, the molten resin flowing from the upstream side of the pipe of the coupling device 10 in a direction of an arrow passes through the through-hole 522 of the removal dissolution unit 50, whereby the solid foreign matter in the molten resin is filtered and separated by the filter 533 (or the filter 534), and the molten resin flows to the downstream side of the pipe.

Returning to FIG. 2, the cylinder part 54 slides the sliding part 53 in the direction perpendicular to the coupling direction via a hydraulic pressure or the like, to cause each of the through-holes 531 and 532 of the sliding part 53 to overlap with the through-hole 522 of the connecting part 52. Accordingly, any one of the through-holes 531 and 532, which is disposed at a position overlapping with the through-hole 522 of the connecting part 52, filters and separates the solid foreign matter mixed in the molten resin passing therethrough. In addition, FIG. 2 shows a state where the through-hole 531 of the sliding part 53 and the through-hole 522 of the connecting part 52 overlap with each other. In this case, since the through-hole 532 of the sliding part 53 does not overlap with the through-hole 522 of the connecting part 52, the through-hole 532 of the sliding part 53 is disposed at a position away from the pipe as shown in FIG. 2. In this state, the filter 534 can be cleaned to remove clogging or the filter 534 can be replaced. The configuration of the screen changer as the removal dissolution unit 50 shown in FIG. 2 is merely an example, and the configuration of the screen changer as the removal dissolution unit 50 is not limited to the configuration shown in FIG. 2. The screen changer may have another configuration that enables the removal or the dissolution of the solid foreign matter in the molten resin flowing through the pipe.

Output Device 80

Returning to FIG. 1, the output device 80 is a device that outputs the molten resin by performing decontamination of a contaminant contained in a resin, such as a PET bottle to be recycled, using a mechanical recycling method (physical regeneration method) or a chemical recycling method (chemical regeneration method). The output device 80 has an output port 81 for outputting the decontaminated resin as the molten resin. The output port 81 has a fixed position and is connected to the coupling device 10. The molten resin decontaminated by the output device 80 is output through the output port 81 and input into the coupling device 10.

The term "mechanical recycling" refers to a series of processes of selecting the resin, such as a collected PET bottle that has been used, crushing the resin, and washing the resin to remove the dirt or the foreign matter on the surface, and then diffusing the contaminant remaining in the resin molten by being exposed to high temperature into the vacuum in the output device 80 to perform the decontamination. In addition, the term "chemical recycling" refers to a series of processes of selecting the resin, such as the collected PET bottle that has been used, chemically decomposing the resin, and re-polymerizing the resin, to perform the decontamination of the contaminant.

Injection Molding Machine 90

The injection molding machine 90 is a molding machine used for manufacturing a molding product using the molten resin as a material. The injection molding machine 90 has an input port 91 for inputting the molten resin into the injection molding machine 90 and is coupled with the output device 80 via the coupling device 10. Therefore, the injection molding machine 90 receives the supply of the molten resin output from the output device 80, and enables the manufacturing of the molding product using the molten resin as the material. In addition, the injection molding machine 90 enables the measurement of the molten resin used as the material for the molding product.

The injection molding machine 90 has a fixed installation position as a whole, but a part of the injection molding machine 90 may move. For example, a plasticizing cylinder (not shown) may move the position of the input port 91 for the molten resin as the material when discharging (purging) the molten resin. As described above, since the position of the output port 81 of the output device 80 is fixed, it is necessary to absorb the movement of the position of the input port 91 for the molten resin. In contrast, in the molten resin supply system 1, the movement of the position of the input port 91 of the injection molding machine 90 is absorbed by the following configuration of the coupling device 10.

Figure 3B:
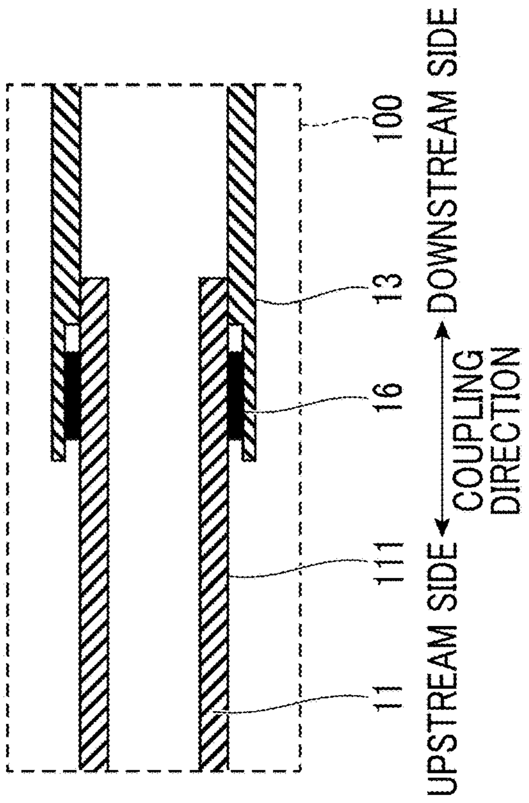
FIGS. 3A and 3B are views showing an example of a configuration of the molten resin supply system including the coupling device in which a sleeve-type telescopic pipe coupling is adopted.
Figure 3A:
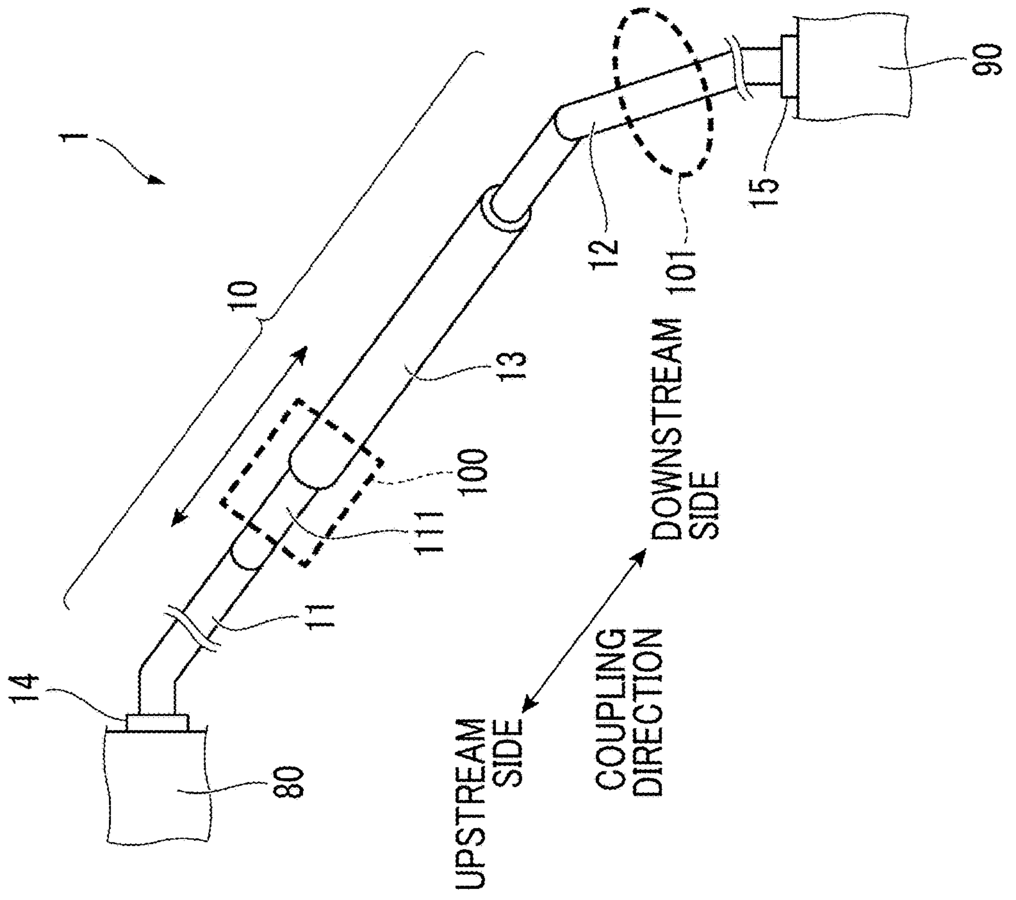

FIGS. 3A and 3B are views showing an example of a configuration of the molten resin supply system 1 including the coupling device 10 in which a sleeve-type telescopic pipe coupling is adopted. FIG. 3A is a view showing an example of an external configuration of the coupling device 10. FIG. 3B is an enlarged view of a part of the sleeve-type telescopic pipe coupling of the coupling device 10.

The coupling device 10 includes pipes 11 and 12, a sleeve outer cylinder 13, and connecting members 14 and 15, and these components are coupled with each other to form a single pipe.

The pipes 11 and 12 are metal pipes with a circular cross-sectional shape through which the molten resin flows. Among the pipes 11 and 12, the pipe 11 is a pipe that has an upstream end part connected to the output device 80 via the connecting member 14 and a downstream end part connected to the sleeve outer cylinder 13. The pipe 11 includes, on a part of the downstream side, a sleeve 111 constituting the sleeve-type telescopic pipe coupling as the coupling of the pipe together with the sleeve outer cylinder 13. The pipe 12 is a pipe that has an upstream end part connected to the sleeve outer cylinder 13 and a downstream end part connected to the injection molding machine 90 via the connecting member 15.

The connecting member 14 is a member for connecting the coupling device 10 to the output device 80, and is fixed to the output device 80 by a flange or the like. The connecting member 14 and the pipe 11 are connected by being fixed using a bolt or the like with a sealing member interposed therebetween. The connecting member 15 is a member for connecting the coupling device 10 to the injection molding machine 90, and is fixed to the injection molding machine 90 by a flange or the like. The connecting member 15 and the pipe 12 are connected by being fixed using a bolt or the like with a sealing member interposed therebetween.

As shown in FIG. 3B that is an enlarged view of a broken line region 100 in FIG. 3A, the sleeve-type telescopic pipe coupling has a configuration in which the sleeve 111 of the pipe 11 reciprocates and slides inside the sleeve outer cylinder 13. The inside of the sleeve outer cylinder 13 is maintained airtight and watertight by the sealing member 16.

In the coupling device 10, the sleeve-type telescopic pipe coupling is adopted as a coupling that displaces, when at least a part of the injection molding machine 90 moves relative to the output device 80, a part of the pipe to absorb the movement. Therefore, even when the position of the connecting member 15 moves in the coupling direction due to the movement of a part of the injection molding machine 90, the movement is absorbed within a range in which the sleeve 111 can reciprocate and slide inside the sleeve outer cylinder 13. Here, the term "movement of a part" of the injection molding machine 90 refers to, for example, the movement of the plasticizing cylinder (not shown) for discharging (purging) the molten resin.

However, as the sleeve 111 reciprocates and slides inside the sleeve outer cylinder 13, the molten resin passing through the inside of the sleeve outer cylinder 13 may be exposed to the outside while adhering to the surface of the sleeve 111. In this case, as the sleeve 111 reciprocates and slides, the exposed molten resin may be abraded and carbonized, and mixed as the solid foreign matter in the molten resin. In addition, the molten resin remaining in an internal gap may deteriorate due to heat or may be abraded and carbonized due, thereby causing the solid foreign matter.

Therefore, the coupling device 10 includes the removal dissolution unit 50 shown in FIG. 2 on the downstream side of the sleeve-type telescopic pipe coupling and on the upstream side of the injection molding machine 90 at a position at which the flow direction of the molten resin is not changed. Specifically, as shown in FIG. 3A, a screen changer as the removal dissolution unit 50 is connected to a broken line region 101 of the pipe 12. Accordingly, the solid foreign matter of the molten resin flowing from the upstream side of the pipe 12 is filtered and separated by the screen changer, and the molten resin flows to the downstream side of the pipe 12. As a result, the molten resin from which the solid foreign matter has been removed is input into the injection molding machine 90.

In summary, the coupling device according to one embodiment of the present invention need only have the following configuration, and can have various embodiments.

That is, the coupling device 10 according to one embodiment includes the pipe including at least the pipes 11 and 12 through which the molten resin passes, in which the coupling device 10 couples the output device 80 that outputs the molten resin to be recycled and the injection molding machine 90 that performs the injection molding of the molten resin with each other by connecting the upstream end part of the pipe to the output device 80 and connecting the downstream end part of the pipe to the injection molding machine 90, and the coupling device 10 includes, on the downstream side of the pipe, the removal dissolution unit 50 that removes or dissolves the solid foreign matter mixed in the molten resin.

Accordingly, the coupling device 10 that couples the output device 80 that outputs the molten resin and the injection molding machine 90 that performs the injection molding of the molten resin with each other by connecting the upstream end part of the pipe through which the molten resin passes to the output device 80 and connecting the downstream end part of the pipe to the injection molding machine 90 includes, on the downstream side of the pipe, the removal dissolution unit 50 that removes or dissolves the solid foreign matter mixed in the molten resin. As a result, the solid foreign matter mixed in the molten resin passing through the pipe can be prevented from being input into the injection molding machine 90 together with the molten resin, and thus a quality of the molding product molded by the injection molding machine 90 can be prevented from deteriorating. In addition, when the molten resin as the material is measured in the injection molding machine 90, the molten resin in which the solid foreign matter is prevented from mixing is measured, and thus the accuracy of the measurement results can be improved.

Here, the coupling device 10 may further include the coupling that displaces, when at least a part of the injection molding machine 90 moves relative to the output device 80, a part of the pipe to absorb the movement.

Accordingly, the solid foreign matter generated inside or outside the coupling that displaces a part of the pipe can be prevented from being input into the injection molding machine 90 together with the molten resin.

In addition, the removal dissolution unit 50 may be disposed on the downstream side of the coupling that displaces a part of the pipe to absorb the movement and on the upstream side of the injection molding machine 90.

Accordingly, the solid foreign matter generated inside or outside the coupling that displaces a part of the pipe is removed or dissolved by the removal dissolution unit 50 disposed on the downstream side of the coupling and on the upstream side of the injection molding machine 90, and thus the solid foreign matter can be prevented from being input into the injection molding machine 90 together with the molten resin.

In addition, the removal dissolution unit 50 may be the filtration device that removes the solid foreign matter by filtering and separating the solid foreign matter.

Accordingly, the solid foreign matter mixed in the molten resin passing through the pipe is filtered, separated, and removed by the filtration device as the removal dissolution unit 50 disposed on the downstream side of the pipe, and thus the solid foreign matter can be prevented from being input into the injection molding machine 90 together with the molten resin.

In addition, the filtration device as the removal dissolution unit 50 may be the screen changer that enables the detachment and replacement of the filter for filtering and separating the solid foreign matter.

Accordingly, the solid foreign matter mixed in the molten resin passing through the pipe is filtered, separated, and removed by the screen changer as the filtration device disposed on the downstream side of the pipe, and thus the solid foreign matter can be prevented from being input into the injection molding machine 90 together with the molten resin.

In addition, the coupling that displaces a part of the pipe may be the sleeve-type telescopic pipe coupling.

Accordingly, the solid foreign matter mixed in the molten resin passing through the pipe including the sleeve-type telescopic pipe coupling is removed or dissolved by the removal dissolution unit 50 disposed on the downstream side of the pipe, and thus the solid foreign matter can be prevented from being input into the injection molding machine 90 together with the molten resin.

Another Embodiment

Configuration of Molten Resin Supply System 2

Figure 4B:
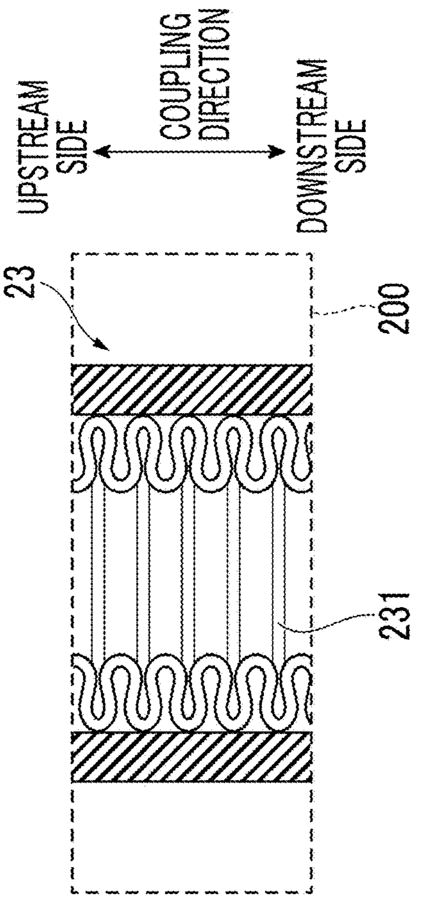
FIGS. 4A and 4B are views showing an example of a configuration of a molten resin supply system including a coupling device in which a flexible metal hose is adopted.
Figure 4A:
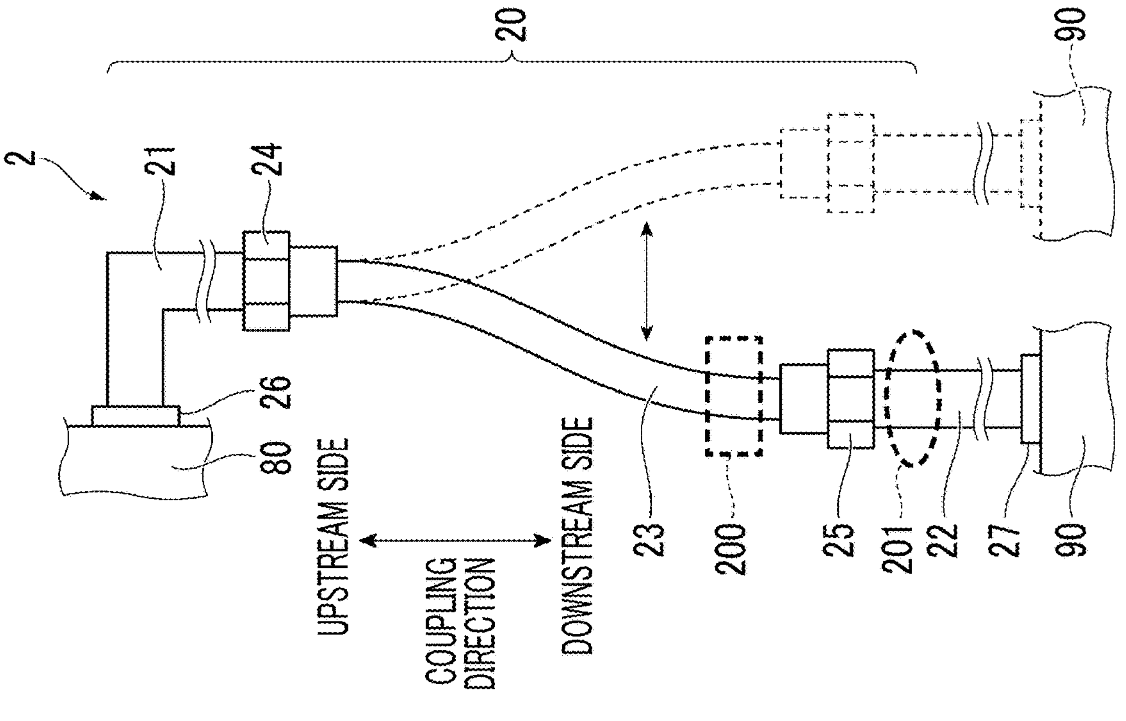

FIGS. 4A and 4B are views showing an example of a configuration of a molten resin supply system 2 including a coupling device 20 in which a flexible metal hose 23 is adopted. FIG. 4A is a view showing an example of an external configuration of the coupling device 20. FIG. 4B is an enlarged view of a part of the flexible metal hose 23 of the coupling device 20.

The molten resin supply system 2 shown in FIGS. 4A and 4B is a system including the coupling device 20, an output device 80 that outputs a molten resin to be recycled, and an injection molding machine 90 that performs injection molding using the molten resin.

Coupled Device 20

The coupling device 20 is a device that includes a pipe that includes pipes through which the molten resin passes and that couples the output device 80 disposed on an upstream side in a coupling direction in which the output device 80 and the injection molding machine 90 are coupled with each other, and the injection molding machine 90 disposed on a downstream side with each other via the pipe. The coupling device 20 includes pipes 21 and 22, the flexible metal hose 23 including connecting members 24 and 25, and connecting members 26 and 27, and these components are coupled with each other to form a single pipe.

The pipes 21 and 22 are metal pipes with a circular cross-sectional shape through which the molten resin flows. Among the pipes 21 and 22, the pipe 21 is a pipe that has an upstream end part connected to the output device 80 via the connecting member 26 and a downstream end part connected to the connecting member 24 of the flexible metal hose 23. The pipe 22 is a pipe that has an upstream end part connected to the connecting member 25 of the flexible metal hose 23 and a downstream end part connected to the injection molding machine 90 via the connecting member 27.

The flexible metal hose 23 is a hose that can be bent in a direction perpendicular to the coupling direction and functions as the coupling of the pipe. As shown in FIG. 4B that is an enlarged view of a broken line region 200 in FIG. 4A, the flexible metal hose 23 has a large number of wave-shaped gaps 231 formed therein.

The connecting member 26 is a member for connecting the coupling device 20 to the output device 80, and is fixed to the output device 80 by a flange or the like. The connecting member 26 and the pipe 21 are connected by being fixed using a bolt or the like with a sealing member interposed therebetween. The connecting member 27 is a member for connecting the coupling device 20 to the injection molding machine 90, and is fixed to the injection molding machine 90 by a flange or the like. The connecting member 27 and the pipe 22 are connected by being fixed using a bolt or the like with a sealing member interposed therebetween.

In the coupling device 20, the flexible metal hose 23 is adopted as a coupling that displaces, when at least a part of the injection molding machine 90 moves relative to the output device 80, a part of the pipe to absorb the movement. Therefore, even when the position of the connecting member 27 moves in the direction perpendicular to the coupling direction along with the movement of a part of the injection molding machine 90, the movement is absorbed within a range in which the flexible metal hose 23 can be bent. However, since the flexible metal hose 23 has a large number of wave-shaped gaps 231 formed inside as described above, a part of the molten resin passing through the inside of the flexible metal hose 23 may enter these gaps 231, remain, solidify, and be mixed in the molten resin as the solid foreign matter.

Therefore, the coupling device 20 includes the removal dissolution unit 50 shown in FIG. 2 on the downstream side of the flexible metal hose 23 and on the upstream side of the injection molding machine 90 at a position at which the flow direction of the molten resin is not changed. Specifically, as shown in FIG. 4A, a screen changer as the removal dissolution unit 50 is connected to a broken line region 201 of the pipe 22. Accordingly, the solid foreign matter of the molten resin flowing from the upstream side of the pipe 22 is filtered and separated by the screen changer, and the molten resin flows to the downstream side of the pipe 22. As a result, the molten resin from which the solid foreign matter has been removed is input into the injection molding machine 90.

The configurations of the output device 80 and the injection molding machine 90 constituting the molten resin supply system 2 are the same as the configurations of the output device 80 and the injection molding machine 90 constituting the molten resin supply system 1 according to one embodiment, and thus the description thereof will be omitted.

In summary, the coupling device according to another embodiment of the present invention need only have the following configuration, and can have various embodiments.

That is, the coupling device 20 according to another embodiment includes the pipe including at least the pipes 21 and 22 through which the molten resin passes, in which the coupling device 20 couples the output device 80 that outputs the molten resin to be recycled and the injection molding machine 90 that performs the injection molding of the molten resin with each other by connecting the upstream end part of the pipe to the output device 80 and connecting the downstream end part of the pipe to the injection molding machine 90, and the coupling device 20 includes, on the downstream side of the pipe, the removal dissolution unit 50 that removes or dissolves the solid foreign matter mixed in the molten resin.

Accordingly, the coupling device 20 that couples the output device 80 that outputs the molten resin and the injection molding machine 90 that performs the injection molding of the molten resin with each other by connecting the upstream end part of the pipe through which the molten resin passes to the output device 80 and connecting the downstream end part of the pipe to the injection molding machine 90 includes, on the downstream side of the pipe, the removal dissolution unit 50 that removes or dissolves the solid foreign matter mixed in the molten resin. Accordingly, the solid foreign matter mixed in the molten resin passing through the pipe or generated in the pipe can be prevented from being input into the injection molding machine 90 together with the molten resin.

Here, the coupling that displaces a part of the pipe may be the flexible metal hose 23.

Accordingly, the solid foreign matter mixed in the molten resin passing through the pipe including the flexible metal hose 23 is removed or dissolved by the removal dissolution unit 50 disposed on the downstream side of the pipe, and thus the solid foreign matter can be prevented from being input into the injection molding machine 90 together with the molten resin.

Still Another Embodiment

Configuration of Molten Resin Supply System 3

Figure 5:
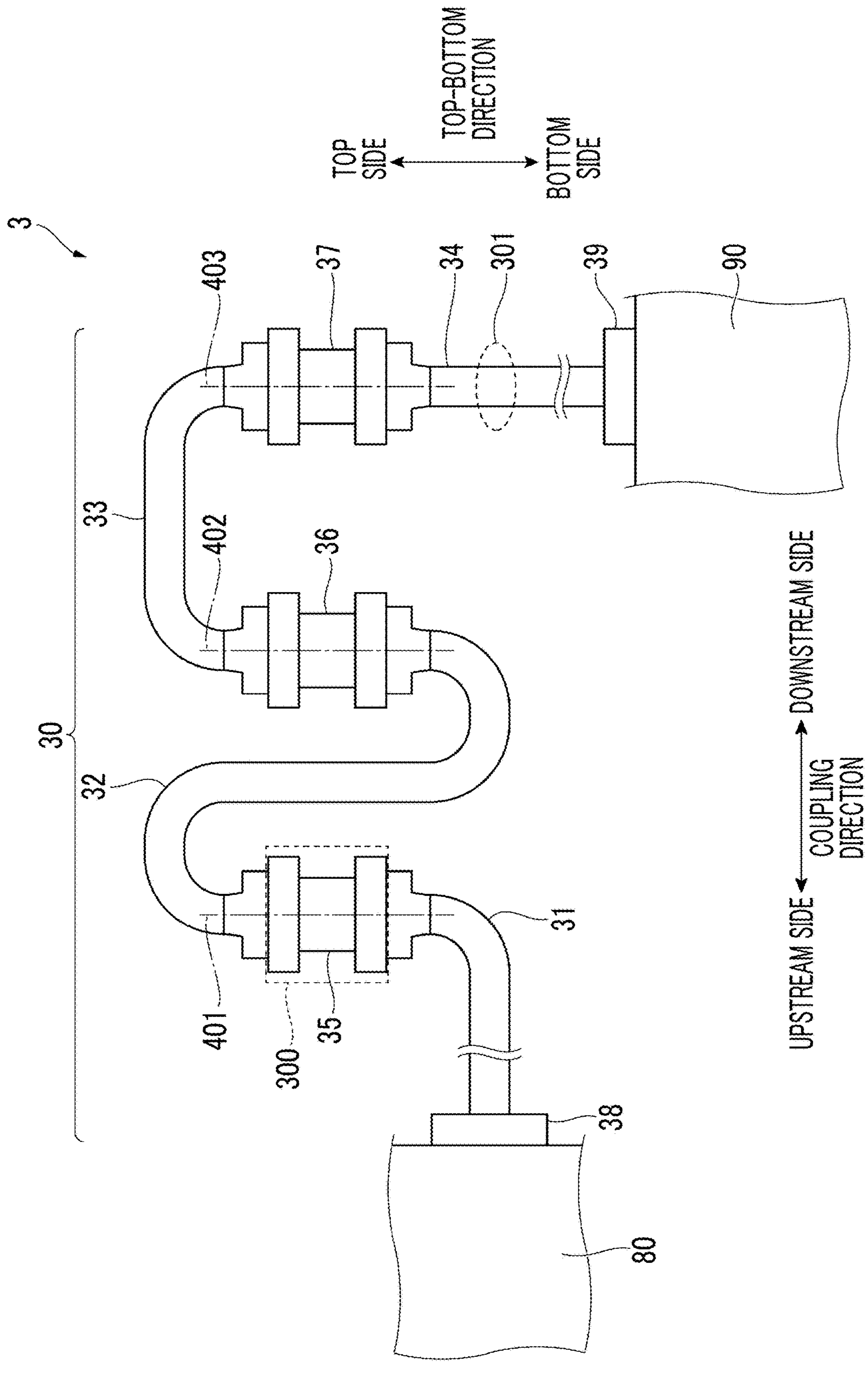
FIG. 5 is a view showing an example of a configuration of a molten resin supply system including a coupling device in which a swivel joint is adopted.
Figure 6:
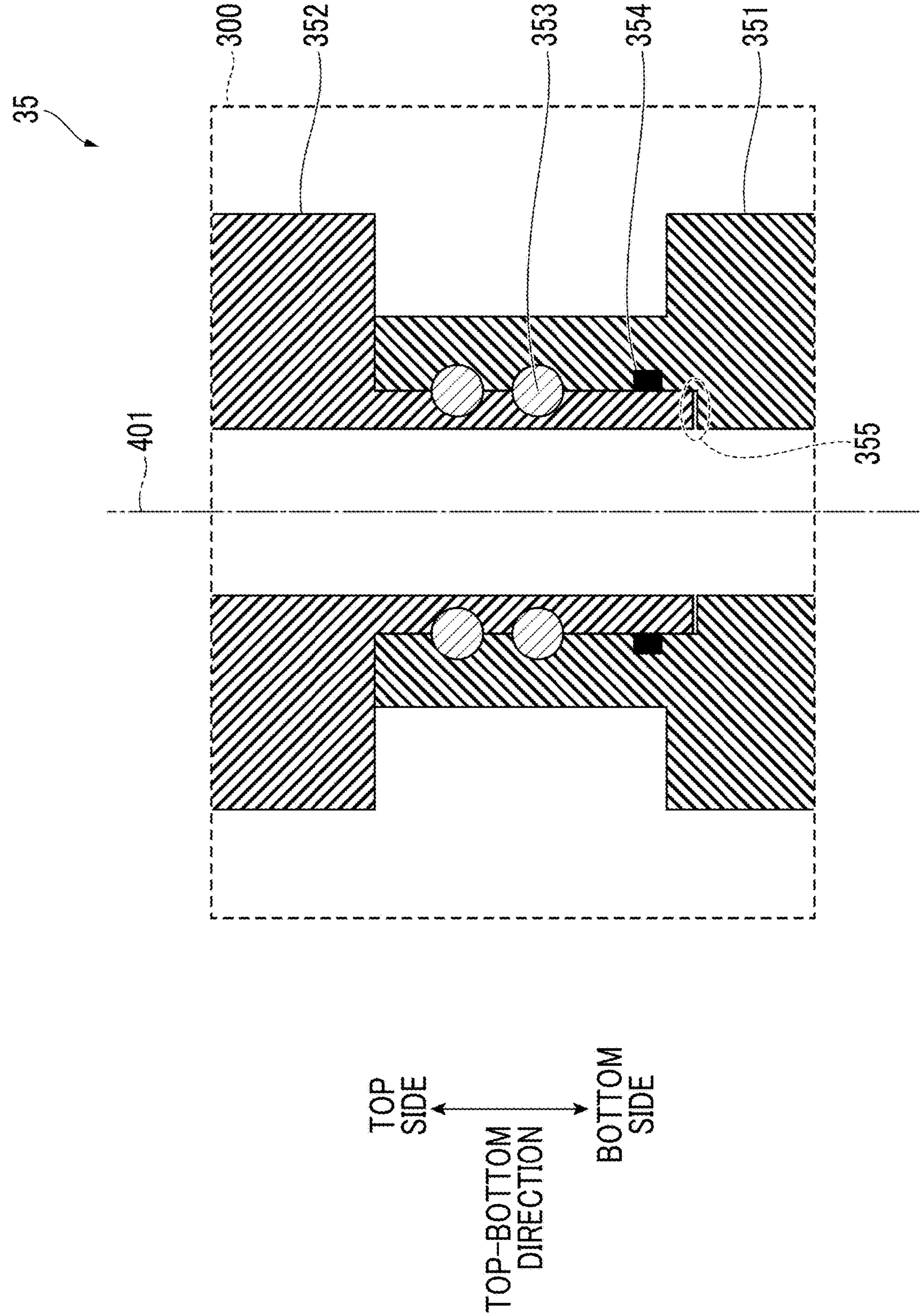
FIG. 6 is a cross-sectional view of a swivel joint of the coupling device.

FIG. 5 is a view showing an example of a configuration of a molten resin supply system 3 including a coupling device 30 in which a swivel joint is adopted. FIG. 6 is a cross-sectional view of a swivel joint 35 of the coupling device 30.

The molten resin supply system 3 shown in FIG. 5 is a system including the coupling device 30, an output device 80 that outputs a molten resin to be recycled, and an injection molding machine 90 that performs injection molding using the molten resin.

Coupling Device 30

The coupling device 30 is a device that includes a pipe that includes pipes through which the molten resin passes and that couples the output device 80 disposed on an upstream side in a coupling direction in which the output device 80 and the injection molding machine 90 are coupled with each other, and the injection molding machine 90 disposed on a downstream side with each other via the pipe. The coupling device 30 includes pipes 31 to 34, swivel joints 35 to 37, and connecting members 38 and 39, and these components are coupled with each other to form a meandering pipe that meanders in a top-bottom direction.

The pipes 31 to 34 are metal pipes with a circular cross-sectional shape through which the molten resin flows. Among the pipes 31 to 34, the pipe 31 is a pipe that has an upstream end part connected to the output device 80 via the connecting member 38 and a downstream end part connected to the swivel joint 35. The pipe 32 is a pipe that has an upstream end part connected to the swivel joint 35 and a downstream end part connected to the swivel joint 36. The pipe 33 is a pipe that has an upstream end part connected to the swivel joint 36 and a downstream end part connected to the swivel joint 37. The pipe 34 is a pipe that has an upstream end part connected to the swivel joint 37 and a downstream end part connected to the injection molding machine 90 via the connecting member 39.

The swivel joint 35 is a swivel joint as the coupling of the pipe, of which an end part on a bottom side in the top-bottom direction is connected to the pipe 31 and an end part on a top side is connected to the pipe 32. The swivel joint refers to a coupling that rotatably couples a plurality of pipes with each other. The swivel joint 35 enables the pipes 31 and 32 to rotate via a rotary shaft 401. The swivel joint 35 and the pipes 31 and 32 are connected by being fixed using a bolt or the like with a sealing member (not shown) interposed therebetween.

As shown in FIG. 6 that is an enlarged view of a broken line region 300 in FIG. 5, the swivel joint 35 is configured with a so-called "rolling bearing" including a rotor 351, a stator 352, and a ball 353. The swivel joint 35 enables the rotor 351 and the stator 352 to rotate via the rotary shaft 401. In addition, the swivel joint 35 includes a sealing member 354 that prevents the leakage of the molten resin passing therethrough. Although a slight gap 355 is formed between the rotor 351 and the stator 352 inside the swivel joint 35, the leakage of the molten resin is prevented by the sealing member 354.

Returning to FIG. 5, the swivel joint 36 is a swivel joint of which an end part on a bottom side in the top-bottom direction is connected to the pipe 32 and an end part on a top side is connected to the pipe 33. The swivel joint 36 enables the pipes 32 and 33 to rotate via a rotary shaft 402. In response to a change in a position of the swivel joint 37 in the coupling direction which will be described later, the swivel joint 36 changes a position thereof in a circumferential direction of the rotary shaft 401 of the swivel joint 35 and a circumferential direction of the rotary shaft 403 of the swivel joint 37 that changes the position thereof. The internal configuration of the swivel joint 36 is the same as the internal configuration of the swivel joint 35.

The swivel joint 37 is a swivel joint of which an end part on the top side in the top-bottom direction is connected to the pipe 33 and an end part on the bottom side is connected to the pipe 34. The swivel joint 37 enables the pipes 33 and 34 to rotate via a rotary shaft 403. In addition, when the position of the connecting member 39 changes in the coupling direction along with the movement of a part of the injection molding machine 90, the swivel joint 37 changes the position thereof accordingly. The internal configuration of the swivel joint 37 is the same as the internal configuration of each of the swivel joints 35 and 36.

The connecting member 38 is a member for connecting the coupling device 30 to the output device 80, and is fixed to the output device 80 by a flange or the like. The connecting member 38 and the pipe 31 are connected by being fixed using a bolt or the like with a sealing member interposed therebetween. The connecting member 39 is a member for connecting the coupling device 30 to the injection molding machine 90, and is fixed to the injection molding machine 90 by a flange or the like. The connecting member 39 and the pipe 34 are connected by being fixed using a bolt or the like with a sealing member interposed therebetween.

In the coupling device 30, the swivel joint is adopted as a coupling that displaces, when at least a part of the injection molding machine 90 moves relative to the output device 80, a part of the pipe to absorb the movement. Therefore, even when the position of the connecting member 39 moves in the coupling direction along with the movement of a part of the injection molding machine 90, the movement is absorbed within a range in which the swivel joints 35 to 37 can rotate. However, for example, as shown in FIG. 6, the swivel joint 35 has the slight gap 355 formed between the rotor 351 and the stator 352. Therefore, a part of the molten resin passing through the inside of the swivel joint 35 may enter these gaps 355, remain, solidify, and be mixed in the molten resin as the solid foreign matter. The swivel joints 36 and 37 have configurations similar to above.

Therefore, the coupling device 30 includes the removal dissolution unit 50 shown in FIG. 2 on the downstream side of the swivel joint 37 and on the upstream side of the injection molding machine 90 at a position at which the flow direction of the molten resin is not changed. Specifically, as shown in FIG. 5, a screen changer as the removal dissolution unit 50 is connected to a broken line region 301 of the pipe 34. Accordingly, the solid foreign matter of the molten resin flowing from the top side of the pipe 34 is filtered and separated by the screen changer, and the molten resin flows to the bottom side of the pipe 34. As a result, the molten resin from which the solid foreign matter has been removed is input into the injection molding machine 90.

The configurations of the output device 80 and the injection molding machine 90 constituting the molten resin supply system 3 are the same as the configurations of the output device 80 and the injection molding machine 90 constituting the molten resin supply system 1 according to one embodiment, and thus the description thereof will be omitted.

In summary, the coupling device according to still another embodiment of the present invention need only have the following configuration, and can have various embodiments.

That is, the coupling device 30 according to still another embodiment includes the pipe including at least the pipes 31 to 34 through which the molten resin passes, in which the coupling device 30 couples the output device 80 that outputs the molten resin to be recycled and the injection molding machine 90 that performs the injection molding of the molten resin with each other by connecting the upstream end part of the pipe to the output device 80 and connecting the downstream end part of the pipe to the injection molding machine 90, and the coupling device 30 includes, on the downstream side of the pipe, the removal dissolution unit 50 that removes or dissolves the solid foreign matter mixed in the molten resin.

Accordingly, the coupling device 30 that couples the output device 80 that outputs the molten resin and the injection molding machine 90 that performs the injection molding of the molten resin with each other by connecting the upstream end part of the pipe through which the molten resin passes to the output device 80 and connecting the downstream end part of the pipe to the injection molding machine 90 includes, on the downstream side of the pipe, the removal dissolution unit 50 that removes or dissolves the solid foreign matter mixed in the molten resin. Accordingly, the solid foreign matter mixed in the molten resin passing through the pipe or generated in the pipe can be prevented from being input into the injection molding machine 90 together with the molten resin.

Here, the coupling that displaces a part of the pipe may be the swivel joints 35 to 37.

Accordingly, the solid foreign matter mixed in the molten resin passing through the pipe including the swivel joint is removed or dissolved by the removal dissolution unit 50 disposed on the downstream side of the pipe, and thus the solid foreign matter can be prevented from being input into the injection molding machine 90 together with the molten resin.

Comparison Between Embodiments

When the coupling device 10 according to one embodiment, the coupling device 20 according to another embodiment, and the coupling device 30 according to still another embodiment are compared, the coupling devices 10, 20, and 30 are common in that the screen changer as the removal dissolution unit 50 is provided on the downstream side of the coupling (for example, the sleeve-type telescopic pipe coupling, the flexible metal hose, and the swivel joint) that displaces a part of the pipe and on the upstream side of the injection molding machine 90 at a position at which the flow direction of the molten resin is not changed. Accordingly, the solid foreign matter mixed in the molten resin flowing through the pipe of each of the coupling devices 10, 20, and 30 is removed. However, there is a difference in an amount of the solid foreign matter mixed in the molten resin and a frequency at which the solid foreign matter is mixed in the molten resin.

That is, since the coupling device 10 according to one embodiment is a coupling device in which the sleeve-type telescopic pipe coupling is adopted, the molten resin exposed outside the pipe may be abraded and carbonized, and mixed as the solid foreign matter in the molten resin as described above. In the coupling device 10 according to one embodiment, the solid foreign matter is more likely to be formed as a reciprocating sliding distance of the sleeve 111 (see FIGS. 3A and 3B) is longer and an area of a part exposed to the outside is larger.

In addition, since the coupling device 20 according to another embodiment is a coupling device that adopts the flexible metal hose, a large number of wave-shaped gaps 231 are formed therein as described above. Therefore, a part of the molten resin passing through the inside of the flexible metal hose 23 may enter these gaps 231, remain, solidify, and be mixed in the molten resin as the solid foreign matter (see FIGS. 4A and 4B). In the coupling device 20 according to another embodiment, the solid foreign matter is more likely to be formed as the flexible metal hose 23 is longer and a larger number of wave-shaped gaps 231 are formed therein.

In addition, the coupling device 30 according to still another embodiment is a coupling device in which the swivel joint is adopted as the coupling, and thus the slight gap 355 is formed between the rotor 351 and the stator 352 as described above. Therefore, a part of the molten resin passing through the inside of the swivel joint 35 may enter these gaps 355, remain, solidify, and be mixed in the molten resin as the solid foreign matter (see FIG. 6).

However, the gap 355 in which the molten resin may remain inside the swivel joint of the coupling device 30 according to still another embodiment is narrow. Therefore, the coupling device 30 according to still another embodiment has a smaller amount of the solid foreign matter mixed in the molten resin and a lower frequency at which the solid foreign matter is mixed in the molten resin than the coupling device 10 according to one embodiment and the coupling device 20 according to another embodiment. As a result, the frequency of cleaning the screen changer as the removal dissolution unit 50 and the frequency of replacing the screen changer are reduced.

It should be understood that the invention is not limited to the above-described embodiment, but may be modified into various forms on the basis of the spirit of the invention. Additionally, the modifications are included in the scope of the invention.

What is claimed is:

1. A coupling device comprising:

a pipe including at least pipes through which a molten resin passes, wherein the coupling device couples an output device that outputs the molten resin to be recycled and an injection molding machine that performs injection molding of the molten resin with each other by connecting an upstream end part of the pipe to the output device and connecting a downstream end part of the pipe to the injection molding machine, the coupling device includes, on a downstream side of the pipe, a removal dissolution unit that removes or dissolves a solid foreign matter mixed in the molten resin, the coupling device further comprises a coupling disposed in the pipe and configured to absorb relative movement between the output device and the injection molding machine, and the removal dissolution unit is disposed in the pipe on a downstream side of the coupling and on an upstream side of the injection molding machine.

2. The coupling device according to claim 1, wherein the removal dissolution unit is a filtration device that removes the solid foreign matter by filtering and separating the solid foreign matter.

3. The coupling device according to claim 2, wherein the filtration device is a screen changer that enables detachment and replacement of a filter for filtering and separating the solid foreign matter.

4. The coupling device according to claim 3, wherein the screen changer includes a main body, a connecting part, a sliding part, and a cylinder part, and the connecting part is provided with a first through-hole penetrating a surface on an upstream side and a surface on a downstream side in a coupling direction, which is a direction in which the coupling device couples the output device and the injection molding machine.

5. The coupling device according to claim 4, wherein the sliding part is provided with a second through-hole and a third through-hole penetrating the sliding part from the upstream side toward the downstream side in the coupling direction, and filters having a filtration function of filtering and separating the solid foreign matter mixed in the molten resin are respectively disposed in the second through-hole and the third through-hole.

6. The coupling device according to claim 5, wherein any one of the second through-hole and the third through-hole changes a position in a direction perpendicular to the coupling direction as the sliding part slides, and overlaps with the first through-hole of the connecting part to form one through-hole.

7. The coupling device according to claim 6, wherein the cylinder part slides the sliding part in the direction perpendicular to the coupling direction, and any one of the second through-hole and the third through-hole, which is disposed at a position overlapping with the first through-hole of the connecting part, filters and separates the solid foreign matter mixed in the molten resin.

8. The coupling device according to claim 1, wherein the coupling is a sleeve-type telescopic pipe coupling.

9. The coupling device according to claim 1, wherein the coupling is a flexible metal hose.

10. The coupling device according to claim 1, wherein the coupling is a swivel joint.

11. A molten resin supply system comprising:

an output device that includes an output port of which a position is fixed and that outputs a molten resin to be recycled from the output port;

an injection molding machine that includes an input port of which a position is movable and that molds a molding product using the molten resin input through the input port; and a coupling device that includes a pipe through which the molten resin passes, that couples the output device and the injection molding machine with each other by connecting an upstream end part of the pipe to the output port and connecting a downstream end part of the pipe to the input port, and that includes, on a downstream side of the pipe, a removal dissolution unit that removes or dissolves a solid foreign matter mixed in the molten resin, wherein the coupling device further includes a coupling disposed in the pipe and configured to absorb relative movement between the output device and the injection molding machine, and the removal dissolution unit is disposed in the pipe on a downstream side of the coupling and on an upstream side of the injection molding machine.

* * * * *